United States Patent [19]
Dahlberg et al.

[11] 3,792,989
[45] Feb. 19, 1974

[54] THERMALLY DIRECTED GLASS CUTTING

[75] Inventors: John R. Dahlberg, Jeannette; James L. Oravitz, Cheswick; Edmund R. Michalik, West Mifflin, all of Pa.

[73] Assignee: PPG Industries, Inc., Pittsburgh, Pa.

[22] Filed: June 21, 1972

[21] Appl. No.: 265,080

Related U.S. Application Data
[62] Division of Ser. No. 72,354, Sept. 15, 1970, Pat. No. 3,730,405.

[52] U.S. Cl............................ 65/112, 65/176, 225/2, 225/93.5, 225/96.5
[51] Int. Cl............................................ C03b 33/02
[58] Field of Search..... 65/112, 113, 174, 175, 176; 225/93.5, 96.5, 2; 219/381

[56] References Cited
UNITED STATES PATENTS

| | | | |
|---|---|---|---|
| 3,587,956 | 6/1971 | Oelke | 225/93.5 |
| 3,371,188 | 2/1968 | Henes et al. | 219/381 |
| 3,695,498 | 10/1972 | Dear | 225/1 UX |

Primary Examiner—Arthur D. Kellogg
Attorney, Agent, or Firm—Thomas F. Shanahan

[57] ABSTRACT

This invention relates to a method and apparatus for cutting glass wherein glass is thermally scored along an intended path of cut, using a non-radiant, surface heating means. A fracture is then directed along the intended path by applying a bending moment about the thermal score.

5 Claims, 3 Drawing Figures

PATENTED FEB 19 1974      3,792,989

3,792,989

THERMALLY DIRECTED GLASS CUTTING

This is a division, of application Ser. No. 72,354, filed Sept. 15, 1970 now U.S. Pat. No. 3,730,408.

BACKGROUND OF THE INVENTION

1. Field of the Invention

This invention relates to a method and apparatus for severing glass sheets by applying heat only to the glass surface along an intended path of cut and applying a bending moment about said path.

2. Description of the Prior Art

The most pertinent prior art of which we are aware comprises Campbell et al., U.S. Pat. No. 1,720,883; Hitner, U.S. Pat. No. 1,777,644; Spinasse, U.S. Pat. No. 1,973,546; Kovacik et al., U.S. Pat. No. 3,344,968; and Häfner, U.S. Pat. No. 3,453,097.

The Campbell et al. patent discloses, for example, the severing of glass in accordance with a method comprising "bringing a hot object or objects or elements, heated electrically or otherwise, into contact with or into close proximity of the glass." It discloses, moreover, that: "In order to quickly initiate the severing action, a nick or fault or other weakened portion may be formed by the apparatus at a point on the glass at the line of cleavage where the severage action is to start."

The Hitner patent discloses, for example, "an improved apparatus adapted to prevent the somewhat irregular line of fracture which has hitherto been characteristic of the severing of glass by the use of an electrically heated wire or ribbon." This patent uses an electrically heated wire for the non-contact severing of glass, but it teaches "providing means for giving a distribution of heat over a substantial area of glass on each side of the ribbon or wire," stating that "as a result, the line of fracture is smooth and regular, approximating in these particulars the line of fracture secured by scoring the glass with a diamond or wheel."

The Spinasse patent discloses, for example, "a tubular portion of metal or other suitable refractory material adapted to present a heating surface in close contact with or in close proximity to the body of the drawing sheet near the region where the same is to be cut to remove the border." It further states: "It will be obvious, therefore, that as a sheet of glass is drawn past the heating element the border of the glass is heated in a path parallel to and near the edge of the sheets so that if the glass could be cut or checked by means of a cold checking tool beyond the heated path, shown by the broken line in FIG. 2, the border can be easily removed without fracturing the body of the sheet."

Kovacik et al. disclose, for example, "A plurality of spaced score lines 20 to 23 are made on one surface of the sheet inwardly of each longitudinal edge and thereafter the portions A, B and C are respectively or successively removed to redistribute the stresses within the glass sheet. The final cut is then made by locating the gauging bar a distance of one-half the width of the heating apparatus from the predetermined line of cut 23 and thereafter aligning the heating apparatus against one surface of the gauging bar to locate the electrical resistance element on the score line 23. Heat is supplied a sufficient period of time to allow the cut to run the entire length of the sheet."

The Häfner patent discloses, for example, a method of cutting glass "wherein the glass sheet is moved continuously past a continuous laser beam which is focused upon the glass sheet. The laser and absorptive characteristics and parameters are selected but the glass absorbs the laser energy and converts it into sufficient heat to enable the separation of the sheet into pieces along the line swept by the laser beam."

SUMMARY OF THE INVENTION

In accordance with this invention, a piece of glass is severed by:

a. inducing an artificial defect in an edge area of the piece along an intended path of cut;

b. providing an in-line array of hot-gas heaters aligned with the path;

c. heating the piece only on a surface in the vicinity of the intended path by activating said heaters; and d. applying a bending moment about the path to sever the piece.

The artificial defect is not an essential feature of the invention but, when used, it does provide higher quality edges. It is normally an edge nick or a surface score (fracture-initiation score) about one-fourth inch to one-half inch in length that is applied to the glass by an operator using a hand tool. It is important to note that this edge nick can be placed on the glass either before or after the sheet is exposed to the array of heaters, as long as the nick is placed on the glass prior to the application of the bending moment. If the edge nick is omitted, the fracture will often "run out" (not follow the intended path of cut) at the ends.

The method of the present invention can be performed on plate glass, float glass, sheet glass and low-expansion glass, with edges being produced, in each instance, that are straight, smooth, strong and perpendicular to the surfaces of the glass.

The present invention is of great importance in connection with the severing of sheets that are greater than 0.25 inch in thickness because when mechanical-scoring means have been used in connection with the above, there has hitherto been difficulty in obtaining a cut edge of satisfactory appearance, high edge strength, and other desirable characteristics. It has been particularly difficult to obtain, in cutting a piece of glass that thick, an edge that is suitable for further use without a further grinding or polishing operation. Moreover, the strength of the cut edge produced by prior-art methods such as hand scoring and snapping usually does not exceed 3,900 pounds per square inch and is frequently considerably less than that, whereas it is frequently desired that, especially without such grinding and polishing, the cut edges exhibit better edge-strength values. The present invention is of particular importance in the severing of glass sheets that are between about 0.50 inch and 0.75 inch in thickness, and even thicker.

Edges produced by any of the thermal severing methods recently developed (see U.S. Pat. application Ser. No. 66,940, filed Aug. 26, 1970, now allowed as U.S. Pat. No. 3,595,497; U.S. Pat. application Ser. No. 66,941, filed Aug. 26, 1970, now allowed as U.S. Pat. No. 3,695,498; and copending U.S. Pat. application Ser. No. 72,353 now U.S. Pat. No. 3,709,414, filed Sept. 15, 1970) have a pristine appearance and high strength. The problem in applying any of these thermal-severing techniques to production cutting has been the inability to achieve directional control on non-bisecting cuts. Recent work by us has revealed that when using an infrared thermal source on trim cuts, the temperature profile about the intended path of cut is not symmetrical, with the trim side being slightly warmer. It has been proposed to use directional controls such as heat shields in conjunction with an infrared source to produce straight, non-bisecting cuts. Heat shields do not appear to be an ideal solution in that they require a large supply of shields be on hand (one for each length of cut).

It is an object of the present invention to provide an edge that is straight, smooth, strong and perpendicular to the surfaces of the glass and yet one that requires no exterior directional controls in its manufacture.

It is a further object of this invention to provide a method and means for severing a glass sheet wherein only the surface of said sheet is heated. This eliminates the adverse effect of the trim edge which causes an asymmetrical temperature profile when the glass is heated through its thickness, as by an infrared source.

In a preferred embodiment, this invention employs the use of an in-line array of hot-gas heaters, so that only the glass surface is heated rather than the surface and the interior, as is the case when using infrared heat or a gas flame. In this preferred embodiment, a fracture initiation score of from one-fourth to one-half inch is placed on a top surface of the leading edge coinciding with the intended path of cut. Relative motion is effected between the glass and the in-line array of heaters, which are nozzled and focused close to the glass to impart a narrow thermal score along the intended path of cut. The leading edge of the glass is then moved into a finger snapper, which exerts an opening bending moment on the glass. The fracture originates at the fracture-initiation score and follows the thermal score across the plate. Trim cuts made in this manner follow the intended path of cut.

As used in this application, the terms "thermal score" and "thermal scoring" do not mean a scratch or groove in the glass surface, but rather a condition brought about by surface heat wherein stresses are created that extend from one surface to an opposite surface of the sheet of glass. The term "satisfactory thermal score" means a thermal score which has weakened the glass to such an extent that a bending moment applied about the score will fracture the glass and leave a high-quality edge.

Distinct advantages are obtained by conducting the cutting in the manner herein taught. In general, when the cutting is done in the manner taught in accordance with this invention, the edge strength of the cut piece is about at least twice that of a piece cut in accordance with prior-art methods such as hand-scoring and snapping. The increase in edge strength is not merely of academic interest, since the edge strength is related to the observed incidence of breakage during any subsequent handling of the edge-cut sheet of glass involved.

DESCRIPTION OF THE DRAWINGS

A complete understanding of the invention may be obtained from the foregoing and following description thereof, taken in conjunction with the appended drawings, in which.

DESCRIPTION OF THE PREFERRED EMBODIMENT

Figure 1:
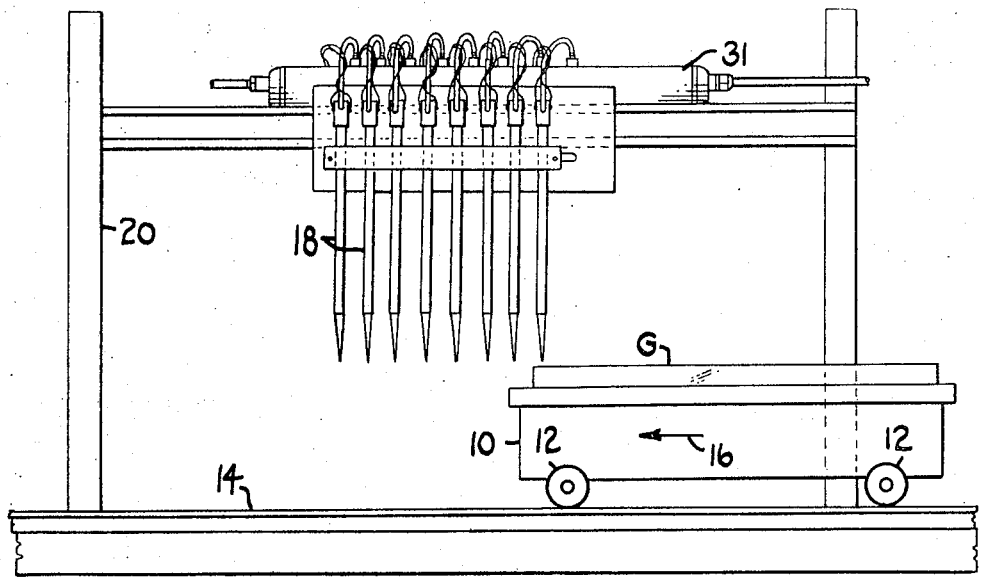
FIG. 1 is a schematic elevation view of equipment used in accordance with the present invention.

Referring to FIG. 1, there is shown a piece of glass G resting on a carriage 10 that has wheels 12 which allow the carriage to move on work table 14. As carriage 10 is moved in the direction of arrow 16, glass G passes beneath an in-line array of heaters 18 which are mounted on table 14 by means of a frame 20 and are spaced about one inch apart, one from another. In the alternative, it is also possible to keep the glass G stationary and move heaters 18. Any arrangement that provides relative movement between the glass G and the heaters 18 is sufficient.

As the glass passes beneath the heaters 18, a thermal score is created in the glass along an intended path of cut. This creates a shallow tensile stress field within the glass, so that a bending moment may be applied about the thermal score to create a fracture, leaving an edge that is strong, straight, smooth and perpendicular to the surfaces of a glass.

The present invention relies on hot-air or hot-gas heaters to provide non-radiant energy and produce quality edges in both bisecting and non-bisecting cuts. In accordance with the present invention, only the surface of the glass is heated. This is different from the prior methods which use an infrared source to heat the glass throughout its thickness. Using the hot-gas heaters of the instant invention eliminates the problem of trim or non-bisecting cuts, since it eliminates internal reflections which cause asymmetrical temperature profiles.

Figure 2:
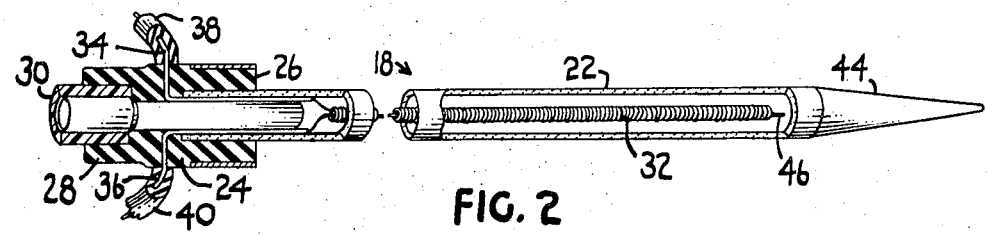
FIG. 2 is a view, drawn to scale, of a heater used in accordance with the present invention.

Referring to FIG. 2, there is shown a gas heater 18, drawn to scale, comprising a quartz tube 22 mounted within one end 26 of a silicone rubber grommet 24. Mounted within the other end 28 of grommet 24 is a plastic tube 30, which supplies the gas to the heater. The other end of the tube 30 is attached to any suitable gas supply, such as the manifold illustrated at 31 in FIG. 1. Mounted within quartz tube 22 is a filament 32 of tungsten or a ferrous alloy or of any other suitable material. At the interior end of the filament 32 on grommet 24 are two electrical connections 34 and 36, which are used to attach wires or conductors 38 and 40 to the filament 32. Wires or conductors 38 and 40 are connected at their other ends (not shown) to a suitable source, such as one of 120 volt, 60 cps.

At the end of tube 22 there is a nozzle 44 that is approximately one inch in length and has an opening between about 0.060 and 0.075 inch. Adjacent to nozzle 44, the tip 46 of the filament 32 heats the air or gas within the tube so that it is between about 1,700° and 2,200°F and perhaps higher.

It is recognized that gas heaters per se are old, and applicants do not claim to have invented a gas heater. Rather, the invention herein resides in using an in-line array of gas heaters for the severing of glass. Suitable gas heaters are manufactured by Sylvania, a subsidiary of General Telephone and Electronics, such as their Model No. 114682.

Successful thermal scoring is a function of the following factors: (a) air temperature, (b) focal distance, (c) number of heaters, (d) scan speed, (e) glass thickness, (f) length of cut, (g) width of trim, and (h) the length of time between the start of heating and the running of the fracture.

The temperature of the air or gas at tip 46 is normally between about 1,700° and 2,200°F. Higher temperatures permit faster scan speeds. With a gas temperature of 1,700°F at the tip 46, the gas temperature at the glass surface is about 900°F and the temperature of the glass at the surface is about 200°F.

It has been found that there should be about 0.05 to 0.10 inch between the glass surface and the tip of the heater. If the heater is moved closer than about 0.05 inch, drag is created and the cut becomes less practical. If the heater is moved farther away, there is a resultant heat loss at the glass surface.

The number of heaters is an important consideration in the present invention. As the glass thickness increases, more heat is necessary (and therefore more heaters) to produce a thermal score that will cause the bending moment to sever the glass along the score. For glass that is one-half of an inch in thickness, five heaters produce a thermal score that yields a high quality edge. When the number of heaters is increased, the scan speed can be increased. For glass that is three-quarters of an inch in thickness, five heaters do not yield enough heat to produce a satisfactory thermal score, no matter how slow the scan speed. When five heaters are used on ¾-inch glass, the fracture propagation does not follow the thermal score. It has been found that an in-line array of eight heaters produce a satisfactory thermal score on ¾-inch glass. With lower scan speeds, perhaps seven or maybe even six heaters arranged in line could be used to produce a satisfactory thermal score.

The speed with which the array of in-line heaters scans the glass is directly related to all of the other factors. Generally, thicker glass requires lower scan speeds.

The length of a trim cut does not in itself have any effect on the thermal score except for the fact that with a long cut, the time between the application of the heat and the running of the fracture by mechanical snapping becomes farther apart. Therefore, with longer trim cuts, more energy must be put into the thermal score so that the bending moment can be applied before the heat has been dissipated from the piece of glass and the thermal score has decayed.

Generally, narrower trims require slower scan speeds. This is probably due to the stronger gradient adjacent to the edge. To get some idea of the effect of trim width on scan speed, consider that for ½-inch glass, scan speed varies from about 150 inches per minute to about 450 inches per minute as trim width varies from 4 inches to 11 inches.

Using eight hot-air heaters of the kind illustrated in FIGS. 1 and 2, spaced 1 inch apart one from another in an in-line arrangement, each operating at 460 watts with an air temperature of 1,700°F at the tip 46, a scan rate of 121 inches per minute will produce a satisfactory thermal score for removing a trim 4 inches by 24 inches from a piece of clear float glass ½ inch of 24 inches by 36 inches. Using the same heater arrangement, a scan rate of 82 inches per minute produces a satisfactory thermal score for removing a trim 6 inches by 31 inches from a piece of clear float glass ¾ inch by 19 inches by 31 inches.

Figure 3:
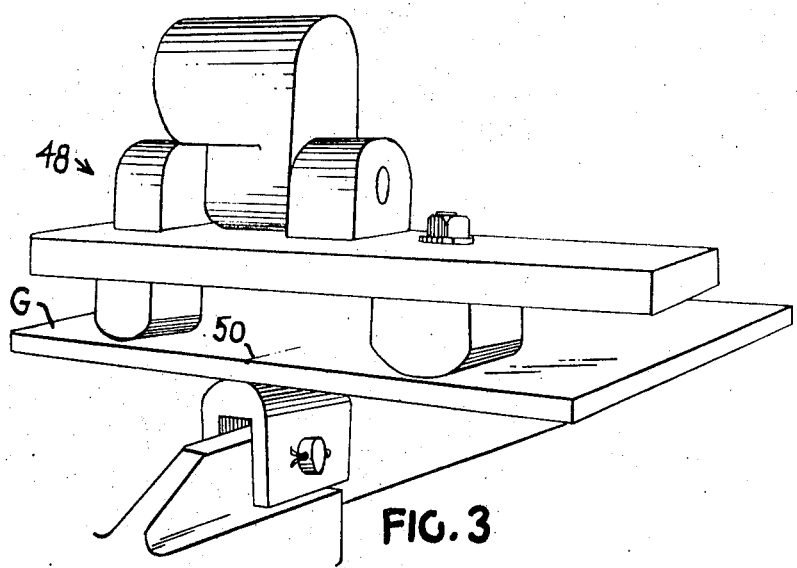
FIG. 3 is a view indicating the practice of applying a bending moment about the thermal score.

It is important that an edge nick (fracture-initiation score) be applied to an edge of the glass surface along the intended path of cut, either immediately before or immediately after the thermal score is applied to the glass surface. Referring to FIG. 3, there is shown a diagram of a snapper 48, applying a bending moment about the thermal score after the artificial defect 50 has been made. Actually, any conventional snapping means may be used.

The application of the bending moment must be about the thermal score, which must pass through the edge nick for a high-quality edge to result. If the edge nick is omitted or if the bending moment is not applied about the thermal score, or if the moment is not applied within about 15 seconds, the resulting edges may have defects, such as lack of smoothness, lack of perpendicularity to the glass surfaces, lack of adequate edge strength, and lack of straightness.

I claim:

1. A method of thermally scoring a piece of glass along an intended path of cut so as to permit the severance thereof along said path comprising the steps of:
   aligning at least one hot-gas heater with said path,
   convectively heating a narrow zone on a surface of said piece along said path by activating said heater, said convective heating being at a temperature and for a time sufficient to introduce a thermal stress throughout the glass beneath said zone without, however, introducing sufficient thermal stress to fracture said glass, contemporaneously therewith providing relative movement between said heater and said glass and maintaining said thermal stress in said glass until it is severed along said intended path of cut.

2. A method according to claim 1 wherein said gas is air.

3. A method according to claim 1 wherein there is provided an in-line array of hot-gas heaters aligned with said path and said piece is moved relative to said array of heaters while said piece is heated.

4. A method according to claim 1 wherein said piece is at least about 0.50 inch in thickness.

5. A method according to claim 1 wherein said piece is at least about 0.75 inch in thickness.

* * * * *